US012763017B2

(12) United States Patent
Gu et al.

(10) Patent No.: US 12,763,017 B2
(45) Date of Patent: Oct. 13, 2026

(54) PIXEL DRIVING CIRCUIT AND DRIVING METHOD THEREOF, AND DISPLAY APPARATUS

(71) Applicant: Everdisplay Optronics (Shanghai) Co., Ltd., Shanghai (CN)

(72) Inventors: Chaohui Gu, Shanghai (CN); Zhen Tian, Shanghai (CN); Haozhe Li, Shanghai (CN)

(73) Assignee: Everdisplay Optronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/699,907

(22) PCT Filed: Jun. 28, 2023

(86) PCT No.: PCT/CN2023/103028
§ 371 (c)(1),
(2) Date: Apr. 10, 2024

(87) PCT Pub. No.: WO2024/098778
PCT Pub. Date: May 16, 2024

(65) Prior Publication Data
US 2025/0265987 A1 Aug. 21, 2025

(30) Foreign Application Priority Data
Nov. 8, 2022 (CN) ......................... 202211391874.5

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0408* (2013.01);
(Continued)

(58) Field of Classification Search
CPC ......... G09G 3/3266; G09G 2300/0408; G09G 2300/0819; G09G 2300/0842;
(Continued)

(56) References Cited

U.S. PATENT DOCUMENTS

2020/0388229 A1* 12/2020 Zhang .................. G09G 3/3266
2020/0394962 A1* 12/2020 Seo ...................... G09G 3/3275
(Continued)

FOREIGN PATENT DOCUMENTS

CN 107591124 A 1/2018
CN 110246454 A 9/2019
(Continued)

OTHER PUBLICATIONS

International Search Report dated Sep. 15, 2023 of International Application No. PCT/CN2023/103028.
(Continued)

*Primary Examiner* — Amr A Awad
*Assistant Examiner* — Aaron Midkiff
(74) *Attorney, Agent, or Firm* — Qinghong Xu

(57) ABSTRACT

Disclosed are a pixel driving circuit and a driving method thereof, and a display apparatus, the circuit includes a driving transistor; a storage capacitor; an initializing unit configured to transmit an initialization voltage to a second node to charge the storage capacitor; a threshold compensation unit configured to obtain a threshold voltage of the driving transistor in response to a first scanning signal scanned at a first frequency and update a potential of the second node; a data writing unit configured to transmit a data signal to a first node; a reset unit configured to reset a potential of the first node in response to a second scanning signal scanned at a second frequency; a light emitting control unit configured to control light emission of an organic light emitting diode; the second frequency being N
(Continued)

times the first frequency, N being an integer greater than or equal to 1.

9 Claims, 4 Drawing Sheets

(52) U.S. Cl.
CPC ............... *G09G 2300/0819* (2013.01); *G09G 2300/0842* (2013.01); *G09G 2300/0847* (2013.01); *G09G 2310/08* (2013.01); *G09G 2320/0247* (2013.01); *G09G 2340/0435* (2013.01)

(58) Field of Classification Search
CPC ....... G09G 2300/0847; G09G 2310/08; G09G 2320/0247; G09G 2340/0435; G09G 3/3208; G09G 3/3225–3258; G09G 2300/0426; G09G 2300/0861; G09G 2320/0238; G09G 3/3233–325; G09G 2310/0286; G09G 2310/0267; G09G 2310/061; G11C 19/28–287
See application file for complete search history.

(56) References Cited

U.S. PATENT DOCUMENTS

| | | | | |
|---|---|---|---|---|
| 2022/0189402 | A1* | 6/2022 | Wang | G09G 3/3266 |
| 2023/0335056 | A1* | 10/2023 | Cho | G09G 3/3266 |
| 2024/0172508 | A1* | 5/2024 | Xu | H10K 59/80522 |
| 2024/0321223 | A1* | 9/2024 | Kim | G09G 3/3233 |

FOREIGN PATENT DOCUMENTS

| | | | | | |
|---|---|---|---|---|---|
| CN | 111489701 | A | | 8/2020 | |
| CN | 111583866 | A | | 8/2020 | |
| CN | 112071262 | A | | 12/2020 | |
| CN | 112309323 | A | | 2/2021 | |
| CN | 112489599 | A | | 3/2021 | |
| CN | 113516950 | A | | 10/2021 | |
| CN | 113571016 | A | | 10/2021 | |
| CN | 114913812 | A | | 8/2022 | |
| CN | 115565493 | A | | 1/2023 | |
| KR | 20230148892 | A | * | 10/2023 | G09G 3/32 |

OTHER PUBLICATIONS

1st Office Action dated Mar. 4, 2023 for Chinese Application No. 202211391874.5.

* cited by examiner

PIXEL DRIVING CIRCUIT AND DRIVING METHOD THEREOF, AND DISPLAY APPARATUS

CROSS-REFERENCE TO RELATED APPLICATION

The present disclosure is an US national phase of International Application No. PCT/CN2023/103028, filed on Jun. 28, 2023, which is based upon and claims priority to Chinese Patent Application No. 202211391874.5, filed on Nov. 8, 2022, and the entire content of which is incorporated herein by reference.

TECHNICAL FIELD

The present disclosure relates to the technical field of display technology, and particularly, to a pixel driving circuit and a driving method thereof, and a display apparatus.

BACKGROUND

Organic light emitting display (OLED), with the advantages of all-solid-state, self-emitting, wide viewing angle, wide color gamut, fast response speed, high luminous efficiency, high brightness, high contrast, ultra-thin, ultra-light, low power consumption, wide range of operating temperature, ability to produce large-sized and flexible panels, and simple manufacturing process, etc., is able to achieve flexible display in a true sense and have gained more and more attention form the market in recent years.

In the related art, in static image scenarios, reducing the refresh rate can significantly reduce power consumption of the panel. However, at a low refresh rate, the hysteresis effect of the driving transistor will bring about a change in intra-frame current; the leakage of switching a transistor will cause the gate potential of the driving transistor to change, which results in a change in intra-frame current; and a cross-voltage delay will be generated during the charging process of the parasitic capacitance of the OLED device, which will all lead to visible flicker of the image appearing on the OLED display.

SUMMARY

In view of the problems in the related art, the purpose of the present disclosure is to provide a pixel driving circuit, a driving method thereof, and a display apparatus, which can solve the problem of flicker appearing on a screen at a low refresh rate.

The embodiments of the present disclosure provide a pixel driving circuit, including: an initializing unit, a data writing unit, a light emitting control unit, a reset unit, a driving transistor and a storage capacitor; where, the initializing unit is configured to transmit an initialization voltage to a second node in response to an initialization scanning signal to charge the storage capacitor; the second node is a connection node between a second terminal of the storage capacitor, a control terminal of the driving transistor and a threshold compensation unit;

the threshold compensation unit is configured to obtain a threshold voltage of the driving transistor in response to a first scanning signal scanned at a first frequency and to update a potential of the second node;

the data writing unit is configured to transmit a data signal to a first node in response to the first scanning signal or a second scanning signal; the first node is a connection node between a second terminal of the driving transistor and the light emitting control unit;

the reset unit is configured to reset a potential of the first node through a reset voltage in response to the second scanning signal scanned at a second frequency, and to change a forward bias state of an organic light emitting diode at the same time through the initialization voltage; and the light emitting control unit is configured to transmit a driving current output by the driving transistor to the organic light emitting diode in response to a light emitting control signal to cause the organic light emitting diode to emit light;

where the second frequency is N times the first frequency, and N is an integer greater than or equal to 1.

In some embodiments, a first power supply and a second power supply are further included, where the light emitting control unit is connected between the first power supply and the second power supply, and a first terminal of the storage capacitor is connected to the first power supply; where the light emitting control unit comprises a fourth transistor and a fifth transistor;

a first terminal of the fourth transistor is connected to the first power supply, a second terminal of the fourth transistor is connected to the first node, and a control terminal of the fourth transistor is connected to an emitting control line; and a first terminal of the fifth transistor is connected to a third node, a second terminal of the fifth transistor is connected to an anode of the organic light emitting diode, and a control terminal of the fifth transistor is connected to the emitting control line.

In some embodiments, the threshold compensation unit includes a third transistor, where a first terminal of the third transistor is connected to the second node, a second terminal of the third transistor is connected to a third node, and a control terminal of the third transistor is connected to a first scanning line.

In some embodiments, the reset unit includes a first transistor and a seventh transistor, and the data writing unit includes the first transistor;

a first terminal of the first transistor is connected to a data line, a second terminal of the first transistor is connected to the first node, and a control terminal of the first transistor is connected to a second scanning line; and a first terminal of the seventh transistor is connected to an initialization signal terminal, a second terminal of the seventh transistor is connected to an anode of the organic light emitting diode, and a control terminal of the seventh transistor is connected to the second scanning line.

In some embodiments, the reset unit includes a seventh transistor and an eighth transistor;

a first terminal of the seventh transistor is connected to a first initialization signal terminal, a second terminal of the seventh transistor is connected to an anode of the organic light emitting diode, and a control terminal of the seventh transistor is connected to a second scanning line; and a first terminal of the eighth transistor is connected to a reset signal terminal, a second terminal of the eighth transistor is connected to the first node, and a control terminal of the eighth transistor is connected to the second scanning line.

In some embodiments, the data writing unit includes a first transistor, a first terminal of the first transistor is connected to a data line, a second terminal of the first transistor is connected to the first node, and a control terminal of the first transistor is connected to a first scanning line.

In some embodiments, the initializing unit includes a sixth transistor, a first terminal of the sixth transistor is connected to an initialization signal terminal, a second terminal of the sixth transistor is connected to the second node, and a control terminal of the sixth transistor is connected to a third scanning line.

In some embodiments, the driving transistor is a second transistor, a first terminal of the second transistor is connected to the first node, a second terminal of the second transistor is connected to a third node, and a control terminal of the second transistor is connected to the second node.

In some embodiments, a scanning circuit is further included, where the scanning circuit includes a cascaded first gate driver on array circuit, a cascaded second gate driver on array circuit, and a cascaded third gate driver on array circuit, and a light emitting control signal driving circuit;

the first gate driver on array circuit is configured to output the first scanning signal;

the second gate driver on array circuit is configured to output the second scanning signal;

the third gate driver on array circuit is configured to output a third scanning signal; and the light emitting control signal driving circuit is configured to output the light emitting control signal.

The embodiments of the present disclosure further provide a driving method for a pixel driving circuit, where the method includes driving the above pixel driving circuit in a scanning cycle, and the scanning cycle includes an initialization phase, a data writing phase, a threshold compensation phase, a light emitting phase and a reset phase;

in the initialization phase: a third scanning signal is an operating level signal, and the initializing unit writes an initialization signal into the second node and charges the storage capacitor;

in the data writing phase and the threshold compensation phase: the first scanning signal, or the first scanning signal and the second scanning signal are the operating level signals, a data signal writing unit writes the data signal into the first node, and the threshold compensation unit writes the threshold compensation voltage at the second node by calling the storage capacitor; and in the light emitting phase and the reset phase: the light emitting control signal is the operating level signal, the light emitting control unit outputs the driving transistor to the organic light emitting diode to control the organic light emitting diode to emit light; and the reset unit resets the potential of the first node at the second frequency to control a light emitting device to emit light.

The embodiments of the present disclosure further provide a display apparatus, where the apparatus includes the above pixel driving circuit.

The pixel driving circuit, the driving method thereof, and the display apparatus provided by the present disclosure have the following advantages.

The present disclosure, by controlling the reset unit to reset the potential of the first node and the potential of the anode of the OLED device at a high frequency, converts the low-frequency flicker at a low refresh rate caused by the driving transistor and the OLED device into a high-frequency flicker that is unrecognizable to the human eye so as to solve the problem of flicker appearing on a screen when displaying at a low refresh rate.

BRIEF DESCRIPTION OF THE DRAWINGS

Other features, purposes and advantages of the present disclosure will become more apparent upon reading the detailed description of the non-limiting embodiments with reference to the following accompanying drawings.

DETAILED DESCRIPTION

Figure 1:
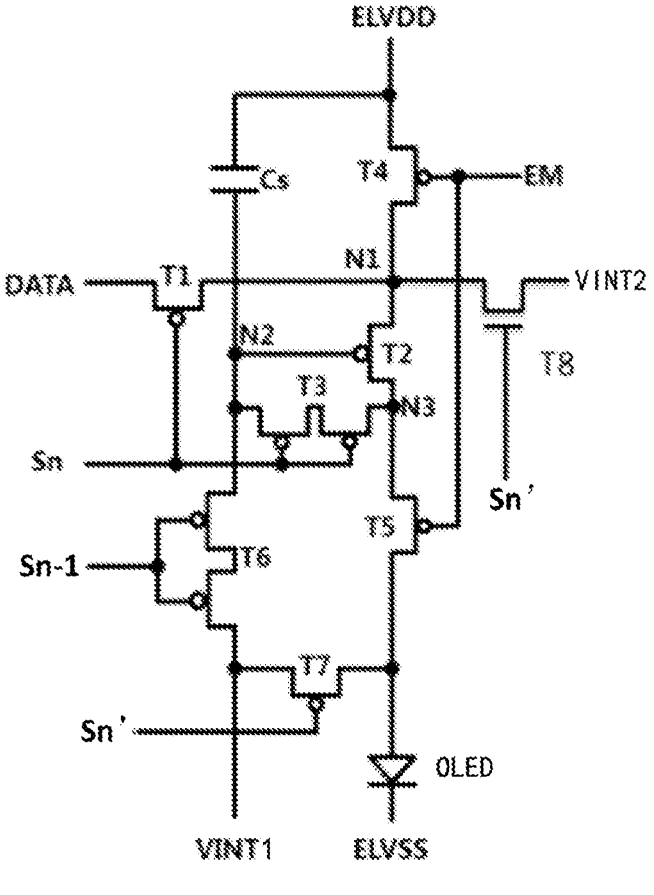
FIG. 1 is a schematic diagram of a pixel driving circuit provided by a first embodiment of the present disclosure.

Exemplary implementation manners will now be described more comprehensively with reference to the accompanying drawings. However, the exemplary implementation manners may be implemented in various forms and should not be construed as being limited to the implementation manners set forth herein. Rather, these implementation manners are provided so that the present disclosure will be thorough and complete, and the concept of the exemplary implementation manners may be comprehensively conveyed to those skilled in the art. The same reference numerals in the drawings denote the same or similar structures, and thus their repeated descriptions will be omitted. The wording "or" and "either" in the description may both mean "and" or "or".

It should be explained that the transistors in this embodiment are all thin film transistors, and each of the thin film transistors has a first terminal, a second terminal and a control terminal. The first terminal is one of the source and the drain, the second terminal is the other of the source and the drain, and the control terminal is the gate. In this embodiment, the first terminal is the source, and the second terminal is the drain. When the transistor is conducted, current flows from the source to the drain. The thin film transistors in this embodiment are all P-type thin film transistors, and the P-type thin film transistors are conducted when the control terminal is at a low level, and are cut off when the control terminal is at a high level.

First Embodiment

Referring to FIG. 1, a pixel driving circuit provided by an embodiment of the present disclosure includes: an initializing unit, a data writing unit, a light emitting control unit, a reset unit, a driving transistor and a storage capacitor Cs.

The initializing unit is configured to transmit an initialization voltage to a second node N2 in response to an initialization scanning signal to charge the storage capacitor Cs, and the second node N2 is a connection node between a second terminal of the storage capacitor Cs, a control terminal of the driving transistor and a threshold compensation unit.

The threshold compensation unit is configured to obtain a threshold voltage of the driving transistor in response to a first scanning signal scanned at a first frequency and to update a potential of the second node N2.

The data writing unit is configured to transmit a data signal to a first node N1 in response to the first scanning signal; the first node N1 is a connection node between a first terminal of the driving transistor and the light emitting control unit.

The reset unit is configured to reset a potential of the first node N1 in response to a second scanning signal scanned at a second frequency, and at the same time to change a forward bias state of an organic light emitting diode (OLED) through the initialization voltage. In this embodiment, by resetting the potential of the first node N1 at a high frequency, the flicker caused by the driving transistor under a low refresh rate display is converted into a high-frequency flicker that is unrecognizable to the human eye; and by resetting the voltage of the anode terminal of the organic light emitting diode (OLED), a low-frequency flicker caused by the cross-voltage delay generated by the OLED parasitic capacitance during the charging process under a low-frequency display is converted into a high-frequency flicker that is unrecognizable to the human eye, so that the flicker problem of the screen under the low refresh rate display is improved by two aspects.

The light emitting control unit is configured to transmit a driving current output by the driving transistor to the organic light emitting diode (OLED) in response to a light emitting control signal to cause the organic light emitting diode (OLED) to emit light.

The second frequency is N times the first frequency, and N is an integer greater than or equal to 1.

In this embodiment, the value of the first frequency ranges from 1 Hz to 30 Hz, the value of the second frequency ranges from 60 Hz to 120 Hz, and the second frequency is an integer multiple of the first frequency. N takes an integer value in the range of [2, 120].

By resetting the potential of the first node N1 at a high frequency, the flicker caused by the driving transistor under a low refresh rate display is converted into a high-frequency flicker that is unrecognizable to the human eye; and by resetting the potential of the anode terminal of the organic light emitting diode (OLED) at a high frequency, a low-frequency flicker caused by the cross-voltage delay generated by the parasitic capacitance during the charging process of the OLED under a low-frequency display is converted into a high-frequency flicker that is unrecognizable to the human eye, so that the flicker problem of the screen under low refresh rate display is improved by two aspects.

A first scanning line Sn−1 corresponding to the (n−1)-th row of pixel driving circuits and a third scanning line Sn−1 corresponding to the n-th row of pixel driving circuits are the same scanning line, and n is an integer greater than or equal to 2.

Referring again to FIG. 1, the pixel driving circuit further includes a first power supply ELVDD and a second power supply ELVSS. The light emitting control unit is connected between the first power supply ELVDD and the second power supply ELVSS. The first terminal of the storage capacitor Cs is connected to the first power supply ELVDD. The first power supply ELVDD is used to provide a first power supply voltage, and the second power supply ELVSS is used to provide a second power supply voltage. The first power supply voltage is a high level, and the second power supply voltage is a low level.

The first terminal of the storage capacitor Cs is connected to the first power supply ELVDD, the second terminal of the storage capacitor Cs is connected to the second node N2, and the storage capacitor Cs is used to couple the potential between the second node N2 and the first power supply ELVDD, so that the organic light emitting diode (OLED) continuously emits light for a duration of one frame.

Specifically, the data writing unit in this embodiment includes a first transistor T1. A first terminal of the first transistor T1 is connected to a data line DATA, a second terminal of the first transistor T1 is connected to the first node N1, and a control terminal of the first transistor T1 is connected to the first scanning line Sn. The first scanning line Sn is used to load the first scanning signal, and the data line DATA is used to load a data signal. The first transistor T1 transmits the data signal to the first node N1 according to the first scanning signal.

In this embodiment, the driving transistor is a second transistor T2. A first terminal of the second transistor T2 is connected to the first node N1, a second terminal of the second transistor T2 is connected to a third node N3, and a control terminal of the second transistor T2 is connected to the second node N2. The second transistor T2 is used to control an operating state of the organic light emitting diode (OLED). The threshold compensation unit includes a third transistor T3. A first terminal of the third transistor T3 is connected to the second node N2, a second terminal of the third transistor T3 is connected to the third node N3, and a control terminal of the third transistor T3 is connected to the first scanning line Sn. The first scanning line Sn is used to load the first scanning signal, and the third transistor T3 electrically connects the second terminal of the second transistor T2 to the control terminal thereof according to the first scanning signal, so that the second node N2 collects the data signal and the threshold voltage of the second transistor T2.

The light emitting control unit includes a fourth transistor T4 and a fifth transistor T5. A first terminal of the fourth transistor T4 is connected to the first power supply ELVDD, a second terminal of the fourth transistor T4 is connected to the first node N1, and a control terminal of the fourth transistor T4 is connected to an emitting control line EM. A first terminal of the fifth transistor T5 is connected to the third node N3, a second terminal of the fifth transistor is connected to the anode of the organic light emitting diode (OLED), and a control terminal of the fifth transistor is connected to the emitting control line EM. The emitting control line EM is used to load a light emitting control signal, and the fourth transistor T4 is used to transmit the first power supply voltage to the first terminal of the second transistor T2 according to the light emitting control signal. The fifth transistor T5 is used to transmit the driving current output by the second transistor T2 to the organic light emitting diode (OLED) according to the light emitting control signal.

The initializing unit includes a sixth transistor T6. A first terminal of the sixth transistor T6 is connected to an initialization signal terminal VINT1, a second terminal of the sixth transistor T6 is connected to the second node N2, and a control terminal of the sixth transistor T6 is connected to the third scanning line Sn−1. The initialization signal terminal VINT1 is used to provide an initialization signal. The sixth transistor T6 is used to transmit the initialization signal provided by the initialization signal terminal VINT1 to the second node N2 according to a third scanning signal provided by the third scanning line Sn−1 to charge the storage capacitor Cs in preparation for the next frame display.

The screen is controlled to display in a low refresh rate state by controlling the conduction frequencies of the third transistor and the sixth transistor. Preferably, the third transistor T3 and the sixth transistor T6 are both double-gate transistors, and the double-gate transistors have low leakage, which can inhibit the change of potential of the second node N2 when the driving transistor T2 drives the organic light emitting diode (OLED) to emit light and avoid the change of potential of the second node N2 caused by the leakage of the sixth transistor T6 and the third transistor T3, i.e., a change of the gate voltage of the second transistor T2, which in turn leads to a flicker caused by a change in driving current when the organic light emitting diode (OLED) emits light.

In this embodiment, the reset unit includes a seventh transistor T7 and an eighth transistor T8. A first terminal of the seventh transistor T7 is connected to the initialization signal terminal VINT1, a second terminal of the seventh transistor T7 is connected to the anode of the organic light emitting diode OLED, and a control terminal of the seventh transistor T7 is connected to a second scanning line Sn'. A first terminal of the eighth transistor T8 is connected to a reset signal terminal VINT2, a second terminal of the eighth transistor T8 is connected to the first node N1, and a control terminal of the eighth transistor T8 is connected to the second scanning line Sn'. The reset voltage of the reset signal terminal VINT2 may be adjusted according to the driving transistor, and is suitable for use with various types of driving transistors. The seventh transistor T7 is used to transmit the initialization signal provided by the initialization signal terminal VINT1 to the anode of the organic light emitting diode (OLED) according to the second scanning signal provided by the second scanning line Sn', so as to change the forward bias state of the anode and cathode of the organic light emitting diode (OLED) by the initialization signal. The eighth transistor T8 is used to transmit a reset signal to the first node N1 according to the second scanning signal provided by the second scanning line Sn', thereby resetting the potential of the first node N1 and further the gate-source voltage Vgs of the second transistor T2. By controlling the conducting of the seventh transistor and the eighth transistor with a high frequency, a low-frequency flicker of the screen under the low refresh rate display is converted to a high-frequency flicker which is not recognizable by the human eye, thereby solving the problem of flicker of the screen when displaying at a low refresh rate.

Referring again to FIG. 1, the organic light emitting diode (OLED) includes an anode and a cathode. The anode of the organic light emitting diode (OLED) is connected to the second terminal of the fifth transistor T5 and the second terminal of the seventh transistor T7. The cathode of the organic light emitting diode (OLED) is connected to the second power supply ELVSS. The organic light emitting diode (OLED) emits light with a corresponding brightness according to the driving current flowing therethrough.

Correspondingly, the present disclosure further provides a driving method for a pixel driving circuit, where the driving method for the pixel driving circuit includes driving the above pixel driving circuit in a scanning cycle.

The scanning cycle of the pixel driving circuit includes an initialization phase, a data writing phase, a threshold compensation phase, a light emitting phase and a reset phase.

In the initialization phase: a third scanning signal is an operating level signal, and the initializing unit writes an initialization signal into the second node N2 and charges the storage capacitor Cs.

In the data writing phase and the threshold compensation phase: the first scanning signal is the operating level signal, the data writing unit writes the data signal into the first node N1, and the threshold compensation unit writes a data voltage and the threshold compensation voltage (threshold voltage Vth of the driving transistor) at the second node N2 by calling the storage capacitor Cs.

In the light emitting phase and the reset phase: the light emitting control signal is the operating level signal, the light emitting control unit transmits the driving current output by the driving transistor to the organic light emitting diode (OLED) to control the organic light emitting diode (OLED) to emit light. During one frame of light emitting process, the reset unit resets the potential of the first node N1 at the second frequency (high frequency), i.e., resets the gate-source voltage Vgs of the driving transistor, thereby controlling the light-emitting device OLED to emit light, so that the OLED is converted to have a high-frequency flicker that is unrecognizable to the human eye during one frame of light emitting process, thus solving the flicker problem of the screen under low refresh display.

Figure 2:
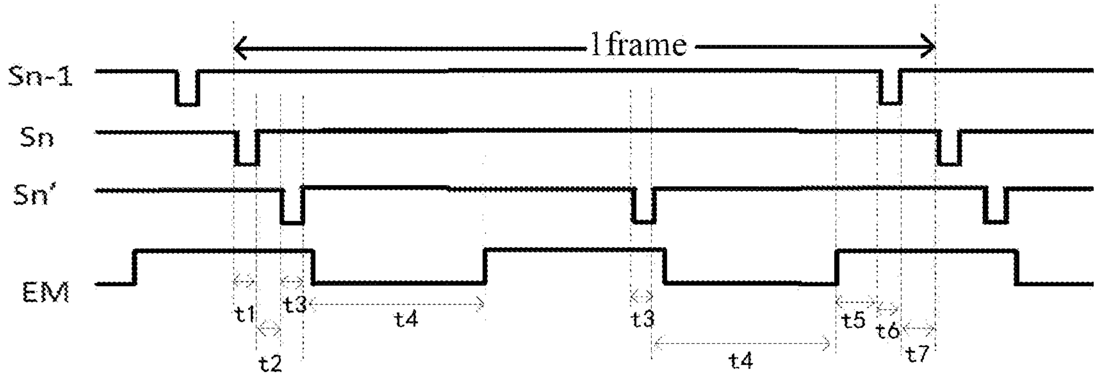
FIG. 2 is a driving timing diagram of the pixel driving circuit provided by the first embodiment of the present disclosure.

Specifically, reference is made to FIG. 2, which is a driving timing diagram of the pixel driving circuit according to the first embodiment of the present disclosure. As shown in FIG. 2, the scanning cycle of the pixel driving circuit includes a first time period t1, a second time period t2, a third time period t3, a fourth time period t4, a fifth time period t5, a sixth time period t6 and a seventh time period t7. From the first time period t1 to the seventh time period t7, one frame of image is displayed.

In the first phase t1 (data writing phase and threshold sampling phase), the first scanning signal provided by the first scanning line Sn changes from a high level to a low level, and the first transistor T1 and the third transistor T3 are conducted. The first transistor T1 transmits, by the first scanning signal, the data signal provided by the data line DATA to the first node N1 via the first terminal of the first transistor T1, and the potential of the first node N1 at this time is a voltage Vdata provided by the data signal. The third transistor T3 transmits the potential of the second node N2 to the potential of the third node N3 through the first scanning signal, at which time the control terminal (gate) of the second transistor T2 has the same terminal potential as that of the second terminal (drain), and thus the data voltage Vdata and the threshold voltage Vth of the second transistor T2 are written into the second node N2.

During the second period t2, the first scanning signal provided by the first scanning line Sn changes from a low level to a high level, the first transistor T1 and the third transistor T3 are turned off, and the writing of data signal is stopped.

During the third period t3 (reset phase), the second scanning signal provided by the second scanning line Sn' changes from a high level to a low level, and the seventh transistor T7 and the eighth transistor T8 are conducted. The seventh transistor T7 sends the initialization signal to the anode of the organic light emitting diode through the second scanning signal. The forward bias state of the anode and cathode of the OLED are changed by the initialization voltage, and it can effectively prevent the unidirectional accumulation of space charges within the organic light emitting layer of the OLED caused by the long-term forward bias, so that the OLED can emit light stably during the light emitting process. The eighth transistor T8 sends the reset signal to the first node N1 through the second scanning signal, i.e., resets the potential of the node N1, and thereby the gate-source voltage Vgs of the second transistor T2 is reset.

During the fourth time period t4 (light emitting phase), the control signal provided by the emitting control line EM changes from a high level to a low level, and the fourth transistor T4 and the fifth transistor T5 are conducted. At this time, the second transistor T2 is conducted and outputs current to drive the organic light emitting diode (OLED) to emit light.

When displaying within one frame, the third time period t3 and the fourth time period t4 are looped several times to convert the low-frequency flicker at a low refresh rate into the high-frequency flicker that is not recognizable to the human eye at a low refresh rate, which can solve the flicker that occurs when displaying at a low refresh rate.

During the fifth time period t5, the control signal provided by the emitting control line EM changes from a low level to a high level, the fourth transistor T4 and the fifth transistor T5 are turned off, the second transistor T2 is turned off, and the OLED stops emitting light.

During the sixth time period t6 (initialization phase), the third scanning signal provided by the third scanning line Sn−1 changes from a high level to a low level, and the sixth transistor T6 is conducted. The potential of the second node N2 is initialized through the initialization signal to prepare for writing the data voltage of the next frame of image.

During the seventh time period t7, the third scanning signal provided by the third scanning line Sn−1 changes from a low level to a high level, the sixth transistor T6 is turned off, thereby completing the display of one frame.

The pixel driving circuit provided by the embodiments of the present disclosure includes a scanning circuit, and the scanning circuit includes a gate driver on array (GOA) circuit and a light emitting control signal driving (Emission driver on Array, EOA) circuit, where the GOA circuit is used to output line scanning signals, and the EOA circuit is used to output light emitting control signals.

Figure 3:
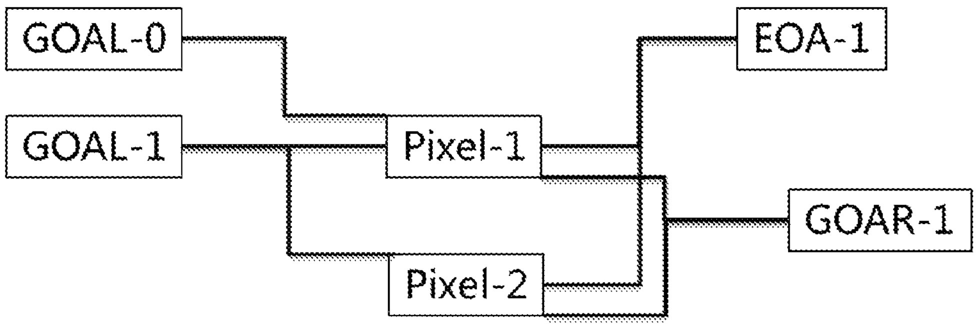
FIG. 3 is a diagram of a pixel driving circuit including a scanning circuit provided by the first embodiment of the present disclosure.

As shown in FIG. 3, the pixel driving circuit in the embodiments of the present disclosure further includes a cascaded first gate driver on array circuit GOAL-1, a cascaded second gate driver on array circuit GOAR-1, a cascaded third gate driver on array circuit GOAL-0 and a light emitting control signal driving circuit EOA-1, where the first gate driver on array circuit GOAL-1 is configured to output the first scanning signal, the second gate driver on array circuit GOAR-1 is configured to output the second scanning signal, the third gate driver on array circuit GOAL-0 is configured to output the third scanning signal, and the EOA circuit is used to output a light emitting control signal. Specifically, GOAL-1 for outputting the first scanning signal and GOAR-1 for outputting the second scanning signal are respectively disposed on both sides of the pixel unit. Each of the GOAR-1 circuits and EOA circuits controls two rows of pixel units respectively. In some embodiments, the number of GOA circuits and EOA circuits may also be increased, so that the GOA circuit and the EOA circuit respectively control one row of pixel units.

Correspondingly, the present disclosure further provides an organic light emitting display apparatus, where the organic light emitting display apparatus includes the pixel driving circuit as described above.

Second Embodiment

Figure 4:
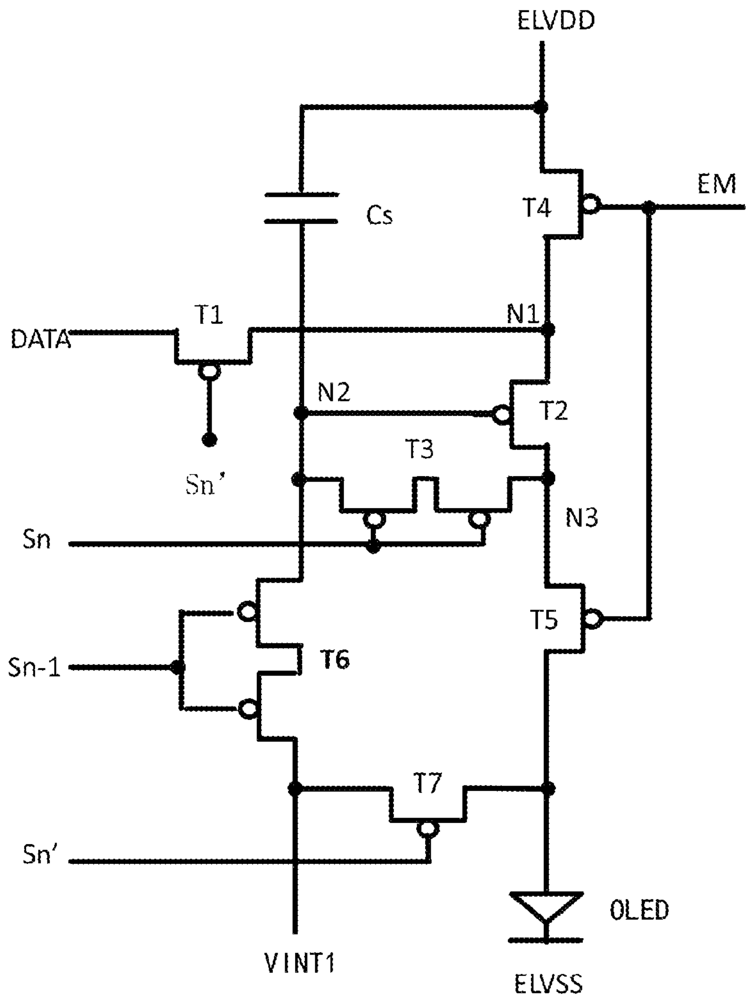
FIG. 4 is a schematic diagram of a pixel driving circuit provided by a second embodiment of the present disclosure.

Reference is made to FIG. 4, which is a schematic structural diagram of a pixel driving circuit according to the second embodiment of the present disclosure. As shown in FIG. 4, the second embodiment differs from the first embodiment in that the reset unit includes the first transistor T1 and the seventh transistor T7, without the eighth transistor T8 in the first embodiment. The potential of the first node N1 is reset by a data signal loaded by the data line DATA, and the control terminal of the first transistor T1 is connected to the second scanning line Sn'.

Specifically, the first terminal of the first transistor T1 is connected to the data line DATA, the second terminal of the first transistor T1 is connected to the first node N1, and the control terminal of the first transistor T1 is connected to the second scanning line Sn'. The first terminal of the seventh transistor T7 is connected to the initialization signal terminal VINT1, the second terminal of the seventh transistor T7 is connected to the anode of the organic light emitting diode (OLED), and the control terminal of the seventh transistor T7 is connected to the second scanning line Sn'.

The second scanning line Sn' is used to load the second scanning signal, the data line DATA is used to load a data signal, and the first transistor T1 transmits the data signal to the first node N1 through the second scanning signal, thereby changing the potential of the first node N1. In this embodiment, the potential at the first node N1 is refreshed by the first transistor T1 using the data signal loaded by the data line DATA, thereby resetting the voltage at the gate-source Vgs of the second transistor T2. Compared with the first embodiment, the driving circuit in this embodiment has fewer transistors and the circuit is simpler.

Figure 5:
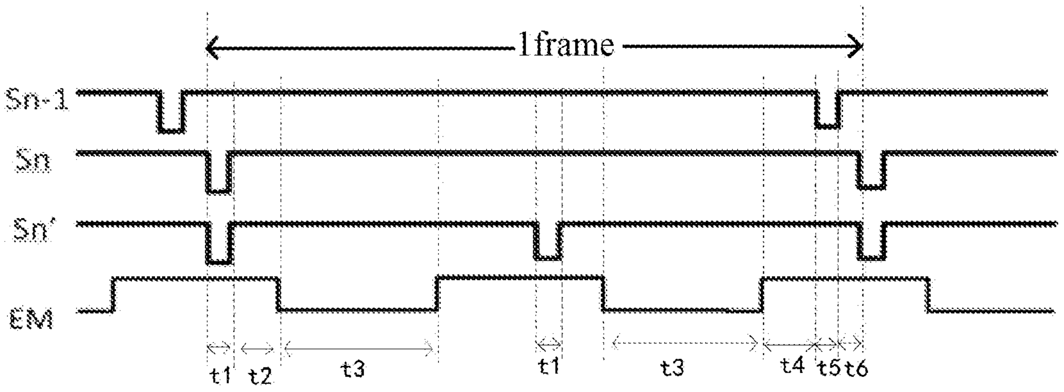
FIG. 5 is a driving timing diagram of the pixel driving circuit provided by the second embodiment of the present disclosure.

Correspondingly, the present disclosure further provides a driving method for a pixel driving circuit, where the driving method for the pixel driving circuit includes driving the above pixel driving circuit in a scanning cycle. The driving method for the pixel driving circuit may refer to the timing diagram of the driving circuit shown in FIG. 5. The difference from the driving timing in the first embodiment is that when Sn in the second embodiment is at the operating level, Sn' is synchronized to the operating level.

During a first time period t1 (data writing phase, threshold sampling phase and reset phase), the first scanning signal provided by the first scanning line Sn changes from a high level to a low level, and the third transistor T3 is conducted. The third transistor T3 transmits the potential of the second node N2 to the potential of the third node N3 through the first scanning signal, at which time the control terminal (gate) of the second transistor T2 has the same potential as that of the second terminal (drain). The second scanning signal provided by the second scanning line Sn' changes from a high level to a low level, and the first transistor T1 and the seventh transistor T7 are conducted. The first transistor T1 transmits the data signal to the first node N1 via the data line DATA, and then writes the threshold voltage of the second transistor T2 and the voltage provided by the data signal into the first node N1 and stores them in the capacitor Cs. At the same time, the seventh transistor T7 sends the initialization signal to the anode of the organic light emitting diode through the second scanning signal. The forward bias state of the anode and cathode of the OLED are changed by the initialization voltage, and it can effectively prevent the unidirectional accumulation of space charge within the organic light emitting layer of the OLED caused by the long-term forward bias, so that the OLED can emit light stably during the light emitting process.

During a second time period t2, the first scanning signal provided by the first scanning line Sn and the second scanning signal provided by the second scanning line Sn' change from a low level to a high level, and the data writing, the threshold sampling, and the resetting of the anode of the OLED are terminated.

During a third time period t3 (light emitting phase), the control signal provided by the emitting control line EM changes from a high level to a low level, and the fourth transistor T4 and the fifth transistor T5 are conducted. At this time, the driving transistor T2 is conducted and outputs current to drive the organic light emitting diode (OLED) to emit light.

When displaying within one frame, the second scanning signal and the light emitting control signal change the high level to the low level at the second frequency. That is, the second scanning signal changes from the high level signal to the low level signal when repeating the first time period t1, and the light emitting control signal changes from the high level signal to the low level signal when repeating the third time period t3, so that the flicker caused by the hysteresis of the second transistor T2 (driving transistor) is converted into a high-frequency flicker, and the flicker brought about by the cross-voltage hysteresis caused by the charging of the organic light emitting diode (OLED) is converted into a high-frequency flicker, thereby solving the flicker problem of the screen under low refresh display. The flicker that occurs in a low refresh rate display can be resolved by converting a low-frequency flicker at a low refresh rate into a high-frequency flicker that is not recognizable to the human eye at a low refresh rate.

During a fourth time period t4, the control signal provided by the emitting control line EM changes from a low level to a high level, the fourth transistor T4 and the fifth transistor T5 are turned off, the second transistor T2 is turned off, and the OLED stops emitting light.

During the fifth time period t5 (initialization phase), the third scanning signal provided by the third scanning line Sn−1 changes from a high level to a low level, and the sixth transistor T6 is conducted. The second node N2 is initialized through the initialization signal to prepare for writing the data voltage of the next frame of image.

During the sixth time period t6, the third scanning signal provided by the third scanning line Sn−1 changes from a low level to a high level, the sixth transistor T6 is turned off, thereby completing the display of one frame.

Correspondingly, the present disclosure further provides a display apparatus. The display apparatus includes any of the pixel driving circuits as described above, so that all the technical effects achieved by the pixel driving circuits described above can be obtained, reference may be made to the above for details, which will not be repeated here.

The above accompanying drawings only schematically illustrate the pixel driving circuit provided by the present disclosure. For the sake of clarity, the shapes of components and the number of components in the above figures are simplified and some components are omitted. Those skilled in the art may make modifications according to actual needs. These modifications fall within the protection scope of the present disclosure and will not be repeated herein.

To sum up, the pixel driving circuit, the driving method thereof, and the display apparatus of the present disclosure have at least the following advantages.

The present disclosure provides a pixel driving circuit, the flicker caused by the hysteresis of the driving transistor and the low-frequency flicker caused by cross-voltage delay when charging the light emitting diode under low refresh rate display are converted into a high-frequency flicker that is not recognizable to the human eye by refreshing the potential of the first node and the potential of the anode of the organic light emitting diode at a high frequency via the reset unit, so as to solve the problem of flicker appearing on a screen when displaying at a low refresh rate.

The above content is a further detailed description of the present disclosure in conjunction with specific preferred embodiments, and it cannot be considered that the specific implementation of the present disclosure is limited to these descriptions. For those of ordinary skill in the art to which the present disclosure belongs, several simple deductions or substitutions may be made without departing from the concept of the present disclosure, all of which should be regarded as falling within the scope of protection of the present disclosure.

What is claimed is:

1. A pixel driving circuit, comprising: an initializing unit, a data writing unit, a light emitting control unit, a reset unit, a driving transistor and a storage capacitor; wherein, the initializing unit is configured to transmit an initialization voltage to a second node in response to an initialization scanning signal to charge the storage capacitor; the second node is a connection node among a second terminal of the storage capacitor, a control terminal of the driving transistor and a threshold compensation unit;

the threshold compensation unit is configured to obtain a threshold voltage of the driving transistor in response to a first scanning signal scanned at a first frequency and to update a potential of the second node;

the data writing unit is configured to transmit a data signal to a first node in response to the first scanning signal or a second scanning signal; the first node is a connection node between a first terminal of the driving transistor and the light emitting control unit;

the reset unit is configured to reset a potential of the first node through a reset voltage in response to the second scanning signal scanned at a second frequency, and to change a forward bias state of an organic light emitting diode at the same time through the initialization voltage, wherein the reset voltage is provided by a data line during a reset phase that is not a data writing phase; and the light emitting control unit is configured to transmit a driving current output by the driving transistor to the organic light emitting diode in response to a light emitting control signal to cause the organic light emitting diode to emit light;

wherein a value of the first frequency ranges from 1 Hz to 30 Hz, a value of the second frequency ranges from 60 Hz to 120 Hz, the second frequency is N times the first frequency, and N takes an integer value in the range of [2, 120], wherein the reset unit comprises a first transistor and a seventh transistor, and the data writing unit comprises the first transistor;

wherein a first terminal of the first transistor is connected to the data line, a second terminal of the first transistor is connected to the first node, and a control terminal of the first transistor is connected to a second scanning line; and wherein a first terminal of the seventh transistor is connected to an initialization signal terminal, a second terminal of the seventh transistor is connected to an anode of the organic light emitting diode, and a control terminal of the seventh transistor is connected to the second scanning line, wherein the threshold compensation unit comprises a third transistor, wherein a first terminal of the third transistor is connected to the second node, a second terminal of the third transistor is connected to a third node, and a control terminal of the third transistor is connected to a first scanning line, wherein the initializing unit comprises a sixth transistor, a first terminal of the sixth transistor is connected to the initialization signal terminal, a second terminal of the sixth transistor is connected to the second node, and a control terminal of the sixth transistor is connected to a third scanning line, wherein the pixel driving circuit further comprises a scanning circuit, wherein the scanning circuit comprises a cascaded first gate driver on array circuit, a cascaded second gate driver on array circuit, a cascaded third gate driver on array circuit, and a light emitting control signal driving circuit; wherein the third gate driver on array circuit is configured to output a third scanning signal, wherein the third scanning signal and the first scanning signal are both output by a same scanning line, the third scanning signal is output by the (n−1)-th stage of the same scanning line, and the first scanning signal is output by the n-th stage of the same scanning line, where n is an integer.

2. The pixel driving circuit according to claim 1, further comprising a first power supply and a second power supply, wherein the light emitting control unit is connected between the first power supply and the second power supply, and a first terminal of the storage capacitor is connected to the first power supply; wherein the light emitting control unit comprises a fourth transistor and a fifth transistor;

wherein a first terminal of the fourth transistor is connected to the first power supply, a second terminal of the fourth transistor is connected to the first node, and a control terminal of the fourth transistor is connected to an emitting control line; and a first terminal of the fifth transistor is connected to the third node, a second terminal of the fifth transistor is connected to an anode of the organic light emitting diode, and a control terminal of the fifth transistor is connected to the emitting control line.

3. The pixel driving circuit according to claim 1, wherein the driving transistor is a second transistor, a first terminal of the second transistor is connected to the first node, a second terminal of the second transistor is connected to the third node, and a control terminal of the second transistor is connected to the second node.

4. The pixel driving circuit according to claim 1, wherein, the first gate driver on array circuit is configured to output the first scanning signal;

the second gate driver on array circuit is configured to output the second scanning signal;

and the light emitting control signal driving circuit is configured to output the light emitting control signal.

5. A driving method for a pixel driving circuit, wherein the method comprises driving a pixel driving circuit in a scanning cycle, the pixel driving circuit comprises: an initializing unit, a data writing unit, a light emitting control unit, a reset unit, a driving transistor and a storage capacitor; wherein, the initializing unit is configured to transmit an initialization voltage to a second node in response to an initialization scanning signal to charge the storage capacitor; the second node is a connection node among a second terminal of the storage capacitor, a control terminal of the driving transistor and a threshold compensation unit;

the threshold compensation unit is configured to obtain a threshold voltage of the driving transistor in response to a first scanning signal scanned at a first frequency and to update a potential of the second node;

the data writing unit is configured to transmit a data signal to a first node in response to the first scanning signal or a second scanning signal; the first node is a connection node between a first terminal of the driving transistor and the light emitting control unit;

the reset unit is configured to reset a potential of the first node through a reset voltage in response to the second scanning signal scanned at a second frequency, and to change a forward bias state of an organic light emitting diode at the same time through the initialization voltage; and the light emitting control unit is configured to transmit a driving current output by the driving transistor to the organic light emitting diode in response to a light emitting control signal to cause the organic light emitting diode to emit light;

wherein a value of the first frequency ranges from 1 Hz to 30 Hz, a value of the second frequency ranges from 60 Hz to 120 Hz, the second frequency is N times the first frequency, and N takes an integer value in the range of [2, 120], wherein the reset unit comprises a first transistor and a seventh transistor, and the data writing unit comprises the first transistor;

wherein a first terminal of the first transistor is connected to a data line, a second terminal of the first transistor is connected to the first node, and a control terminal of the first transistor is connected to a second scanning line; and wherein a first terminal of the seventh transistor is connected to an initialization signal terminal, a second terminal of the seventh transistor is connected to an anode of the organic light emitting diode, and a control terminal of the seventh transistor is connected to the second scanning line;

and wherein the scanning cycle comprises an initialization phase, a data writing phase, a threshold compensation phase, a light emitting phase and a reset phase;

wherein in the initialization phase: a third scanning signal is an operating level signal, and the initializing unit writes an initialization signal into the second node and charges the storage capacitor;

wherein in the data writing phase and the threshold compensation phase: the first scanning signal, or the first scanning signal and the second scanning signal is the operating level signal, the data writing unit writes the data signal into the first node, and the threshold compensation unit writes the threshold compensation voltage at the second node by calling the storage capacitor; and wherein in the light emitting phase and the reset phase: the light emitting control signal is the operating level signal, the light emitting control unit transmits a driving current output by the driving transistor to the organic light emitting diode to control the organic light emitting diode to emit light; and the reset unit resets the potential of the first node at the second frequency to control a light emitting device to emit light, wherein the reset voltage is provided by the data line during the reset phase, wherein the threshold compensation unit comprises a third transistor, wherein a first terminal of the third transistor is connected to the second node, a second terminal of the third transistor is connected to a third node, and a control terminal of the third transistor is connected to a first scanning line, wherein the initializing unit comprises a sixth transistor, a first terminal of the sixth transistor is connected to the initialization signal terminal, a second terminal of the sixth transistor is connected to the second node, and a control terminal of the sixth transistor is connected to a third scanning line, wherein the pixel driving circuit further comprises a scanning circuit, wherein the scanning circuit comprises a cascaded first gate driver on array circuit, a cascaded second gate driver on array circuit, a cascaded third gate driver on array circuit, and a light emitting control signal driving circuit; wherein the third gate driver on array circuit is configured to output a third scanning signal, wherein the third scanning signal and the first scanning signal are both output by a same scanning line, the third scanning signal is output by the (n−1)-th stage of the same scanning line, and the first scanning signal is output by the n-th stage of the same scanning line, where n is an integer.

6. A display apparatus, comprising a pixel driving circuit, wherein the pixel driving circuit comprises: an initializing unit, a data writing unit, a light emitting control unit, a reset unit, a driving transistor and a storage capacitor; wherein, the initializing unit is configured to transmit an initialization voltage to a second node in response to an initialization scanning signal to charge the storage capacitor; the second node is a connection node among a second terminal of the storage capacitor, a control terminal of the driving transistor and a threshold compensation unit;

the threshold compensation unit is configured to obtain a threshold voltage of the driving transistor in response to a first scanning signal scanned at a first frequency and to update a potential of the second node;

the data writing unit is configured to transmit a data signal to a first node in response to the first scanning signal or a second scanning signal; the first node is a connection node between a first terminal of the driving transistor and the light emitting control unit;

the reset unit is configured to reset a potential of the first node through a reset voltage in response to the second scanning signal scanned at a second frequency, and to change a forward bias state of an organic light emitting diode at the same time through the initialization voltage, wherein the reset voltage is provided by a data line during a reset phase that is not a data writing phase; and the light emitting control unit is configured to transmit a driving current output by the driving transistor to the organic light emitting diode in response to a light emitting control signal to cause the organic light emitting diode to emit light;

wherein a value of the first frequency ranges from 1 Hz to 30 Hz, a value of the second frequency ranges from 60 Hz to 120 Hz, the second frequency is N times the first frequency, and N takes an integer value in the range of [2, 120], wherein the reset unit comprises a first transistor and a seventh transistor, and the data writing unit comprises the first transistor;

wherein a first terminal of the first transistor is connected to the data line, a second terminal of the first transistor is connected to the first node, and a control terminal of the first transistor is connected to a second scanning line; and wherein a first terminal of the seventh transistor is connected to an initialization signal terminal, a second terminal of the seventh transistor is connected to an anode of the organic light emitting diode, and a control terminal of the seventh transistor is connected to the second scanning line, wherein the threshold compensation unit comprises a third transistor, wherein a first terminal of the third transistor is connected to the second node, a second terminal of the third transistor is connected to a third node, and a control terminal of the third transistor is connected to a first scanning line, wherein the initializing unit comprises a sixth transistor, a first terminal of the sixth transistor is connected to the initialization signal terminal, a second terminal of the sixth transistor is connected to the second node, and a control terminal of the sixth transistor is connected to a third scanning line, wherein the pixel driving circuit further comprises a scanning circuit, wherein the scanning circuit comprises a cascaded first gate driver on array circuit, a cascaded second gate driver on array circuit, a cascaded third gate driver on array circuit, and a light emitting control signal driving circuit; wherein the third gate driver on array circuit is configured to output a third scanning signal, wherein the third scanning signal and the first scanning signal are both output by a same scanning line, the third scanning signal is output by the (n−1)-th stage of the same scanning line, and the first scanning signal is output by the n-th stage of the same scanning line, where n is an integer.

7. The display apparatus according to claim 6, further comprising a first power supply and a second power supply, wherein the light emitting control unit is connected between the first power supply and the second power supply, and a first terminal of the storage capacitor is connected to the first power supply; wherein the light emitting control unit comprises a fourth transistor and a fifth transistor;

wherein a first terminal of the fourth transistor is connected to the first power supply, a second terminal of the fourth transistor is connected to the first node, and a control terminal of the fourth transistor is connected to an emitting control line; and a first terminal of the fifth transistor is connected to the third node, a second terminal of the fifth transistor is connected to an anode of the organic light emitting diode, and a control terminal of the fifth transistor is connected to the emitting control line.

8. The display apparatus according to claim 6, wherein the driving transistor is a second transistor, a first terminal of the second transistor is connected to the first node, a second terminal of the second transistor is connected to the third node, and a control terminal of the second transistor is connected to the second node.

9. The display apparatus according to claim 6, wherein, the first gate driver on array circuit is configured to output the first scanning signal;

the second gate driver on array circuit is configured to output the second scanning signal;

and the light emitting control signal driving circuit is configured to output the light emitting control signal.

* * * * *